United States Patent [19]
Yee

[11] Patent Number: 5,838,538
[45] Date of Patent: *Nov. 17, 1998

[54] COMPUTER SYSTEM WITH A CHASSIS EQUIPPED WITH SUPPORT STRUCTURES CONFIGURED TO SUPPORT MULTIPLE LENGTH VERSIONS OF A PRINTED CIRCUIT BOARD

[75] Inventor: Dawson L. Yee, Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 748,864

[22] Filed: Nov. 14, 1996

[51] Int. Cl.$^6$ .................. G06F 1/16; H05K 7/02

[52] U.S. Cl. .......... 361/683; 361/756; 439/374

[58] Field of Search ............... 439/64, 377, 374, 439/929; 364/708.1; 361/683, 802, 741, 742, 756, 758, 724, 725, 726, 727, 684, 686, 788

[56] References Cited

U.S. PATENT DOCUMENTS 3,728,662  4/1973  Puri ................... 361/802 X

Primary Examiner—Michael W. Phillips
Attorney, Agent, or Firm—David J. Kaplan

[57] ABSTRACT

A computer system including a chassis having a number of PCB support structures affixed thereon is disclosed. The PCB support structures are configured to support a PCB of one of a number of pre-determined lengths, employing one of a number of subset combinations of the PCB support structures. However, a constant predefined total number of fasteners is employed regardless of the length of the PCB.

8 Claims, 4 Drawing Sheets

5,838,538

COMPUTER SYSTEM WITH A CHASSIS EQUIPPED WITH SUPPORT STRUCTURES CONFIGURED TO SUPPORT MULTIPLE LENGTH VERSIONS OF A PRINTED CIRCUIT BOARD

FIELD OF THE INVENTION

The present invention relates to the assembly of a computer system and more particularly to a computer system chassis having printed circuit board support structures.

BACKGROUND OF THE INVENTION

The primary parts of a basic, desktop computer system include a keyboard, a monitor, and a box that contains most of the electronic devices that make the computer system work. The box includes a chassis or frame that houses the electronic devices in a convenient form factor. Included in the chassis are electronic devices externally apparent to the computer system user such as a disk drive, CD-ROM drive, and various switches, knobs, sockets, and light indicators. Removing the cover that protects these electronic devices reveals many more key electronic devices including, for example, processors, memory units, clocking devices, interfaces, and peripheral components, all of which are electrically coupled together on printed circuit boards (PCBs). One of these PCBs, usually the PCB containing the central processing unit and main memory, is referred to as the motherboard.

FIG. 1A is a top-down view of different sized motherboards 11 inside chassis 15 in accordance with the prior art. After the motherboard 11 of the desired size is selected, motherboard 11 is attached to the bottom of chassis 15 by screws that are screwed through the motherboard and into support structures 10. Motherboard 11 is also coupled to socket 12 of riser 13. FIG. 1B is a side view of the structure of FIG. 1A along the length of motherboard 11, showing how a selected motherboard 11 is affixed to chassis 15 by screws inserted through the motherboard and into support structures 10. Motherboard 11 contains electronic devices and interconnect lines (not shown), many of which are disposed on the top side of the motherboard. The selected motherboard of the three shown in FIG. 1A (having a length of 16, 17, or 18) includes electrical contact regions disposed at the edge of the motherboard in the region inserted into socket 12.

In accordance with the prior art design of FIG. 1A, support structures 10 come prefabricated in chassis 15. Therefore, holes for the screws that secure the motherboard to the support structures must be drilled into the motherboard to accommodate the predefined support structure locations. Unfortunately, there is a limitation as to how far a motherboard can overhang a support structure before the motherboard becomes unstable and its reliability degraded. For example, a motherboard having length 17 could not be supported by this chassis design because its lower edge (the edge closest to the front of the chassis) is too far from its nearest support structures. As a result, if there are too many electronic devices on the motherboard to shrink its size down to length 16, the motherboard size must be increased to length 18, thereby wasting a considerable amount of PCB and chassis space.

As consumers demand increased computer system functionality in smaller form factors, more electronic devices need to be squeezed into the limited space of PCBs, including motherboard 11. One drawback of the prior art design of FIG. 1A is that for the larger motherboard 11 having length 18, there is a significant area of "keep-out" regions on the motherboard. A keep-out region is a region on the PCB where electronic devices cannot be placed because of some mechanical obstruction. For example, each screw that is drilled through the motherboard to secure the motherboard to the nine support structures 10 creates a keep-out region in the vicinity of the screw head. Unfortunately, larger motherboards require more screw holes to be drilled through the motherboard so that the holes correspond to the predefined set of support structures for the motherboard screws.

As consumers desire lower priced computer systems, it becomes advantageous to promote computer system chassis designs that can accommodate PCBs, such as motherboards, from any number of different motherboard vendors. Promoting motherboard competition in this manner typically has the effect of lowering motherboard prices. Motherboards from different vendors, however, may be different sizes. Unfortunately, as described above, the chassis design of FIG. 1A cannot accommodate motherboards having lengths that would overhang the predefined support structures by greater than a specified distance (usually, any distance greater than approximately one inch).

As consumers and computer support personnel require more easily serviceable computer systems, it becomes desirable to implement a computer chassis design that allows for easy access to the motherboard. Allowing for easy access to the motherboard makes it easier to access key electronic devices such as the processor and system memory so that, for example, a computer system user can quickly upgrade either of these components. Unfortunately, because the chassis design of the prior art structure of FIG. 1A affixes motherboard 11 to the bottom of chassis 15 using screws that are screwed into support structures 10, it is necessary to remove the PCBs and other electronic devices that may be placed above motherboard 11 inside the chassis before removing the screws. This makes it difficult to access and service the electronic components on the motherboard.

SUMMARY OF THE INVENTION

A computer system including a chassis having a number of PCB support structures affixed thereon is disclosed. The PCB support structures are configured to support a PCB of one of a number of pre-determined lengths, employing one of a number of subset combinations of the PCB support structures. However, a constant predefined total number of fasteners is employed regardless of the length of the PCB.

Other features of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A computer system chassis is described that supports printed circuit boards (PCBs), such as, for example, motherboards, of varying lengths without increasing the overall number of fasteners inserted through the PCB. Using fasteners, two rails are attached to the bottom of the motherboard, one near the inside edge (opposite the back of the computer system) and the other approximately located at the center of the motherboard. At least three rail guides are attached to the bottom of the computer chassis, two of which correspond to the two rails attached to the motherboard, for a given motherboard length. The two rails on the motherboard cooperatively engage the two corresponding rail guides attached to the chassis, allowing the motherboard to slide along the rail guides with respect to the chassis.

The cooperative engagement between the rails mounted beneath the motherboard and the rail guides mounted to the chassis provide both support for the motherboard and a mechanism for easily attaching and removing the motherboard from the chassis, without the need to undo extra screws. This allows for easy access to the motherboard to accommodate servicing of the motherboard. In addition, because only two rails are mounted underneath the motherboard regardless of the length of the motherboard, the number of fasteners inserted through the motherboard and into the rails remains constant, thereby reducing the area of top side keep-out regions, particularly for larger motherboards. Also, because at least three rail guides are attached to the bottom of the computer chassis, only two of which correspond to the two rails attached to the motherboard for a particular motherboard length, motherboards of varying lengths are supported by the inclusion of these additional rail guides.

The motherboard and chassis design are described in more detail below to provide a more thorough description of how to implement an embodiment of the present invention. Various other configurations and implementations in accordance with alternate embodiments of the present invention are also described in more detail below.

Figure 1A:
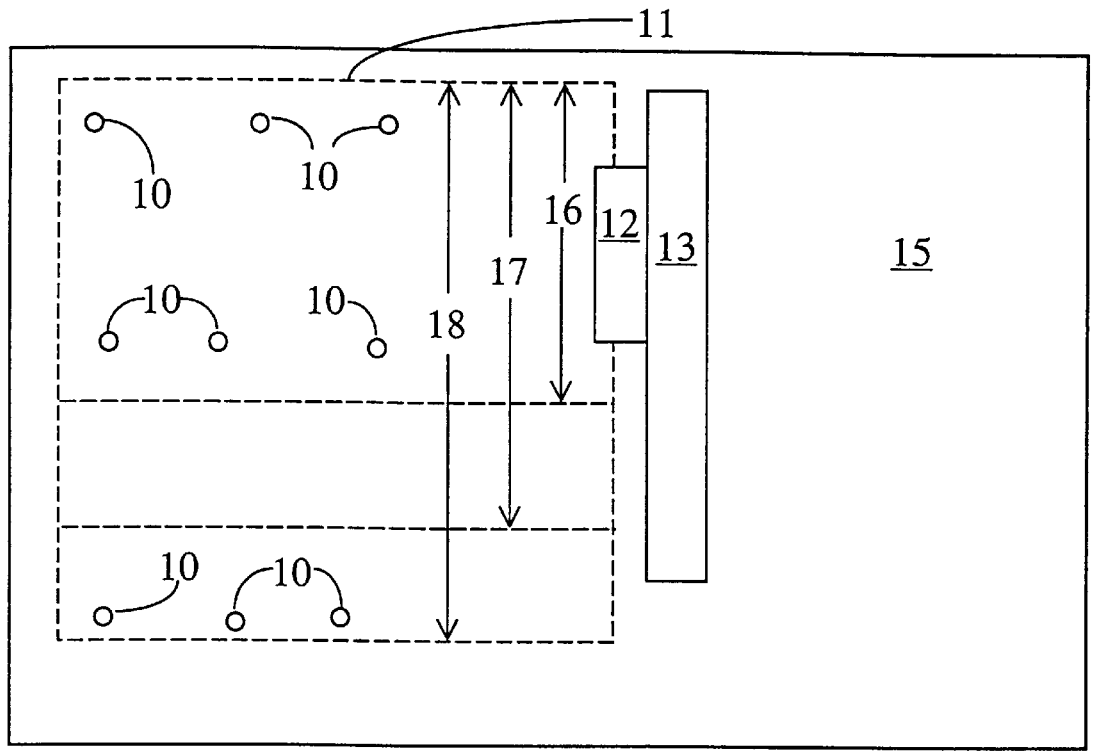
FIG. 1A is a top view of a computer system chassis formed in accordance with the prior art.
Figure 1B:
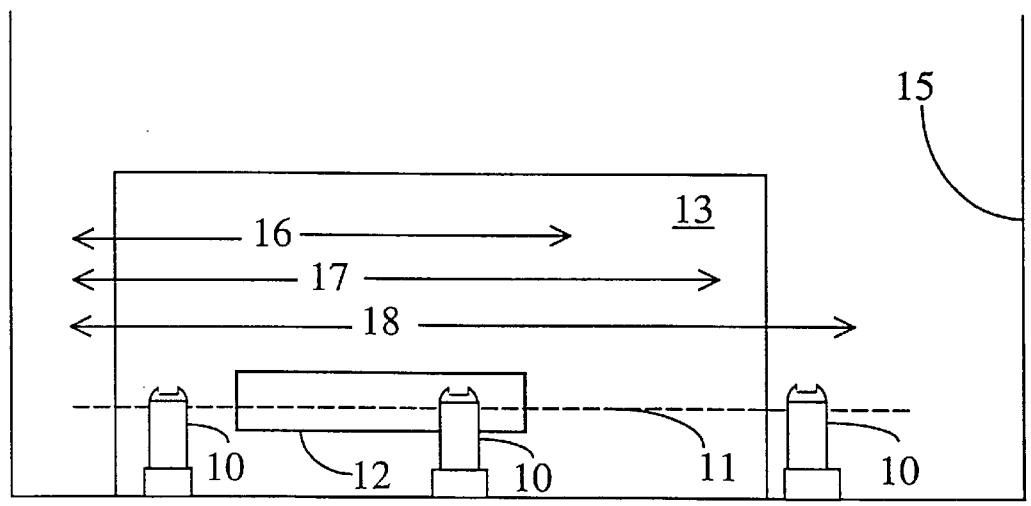
FIG. 1B is a side view of the structure of FIG. 1A.
Figure 2A:
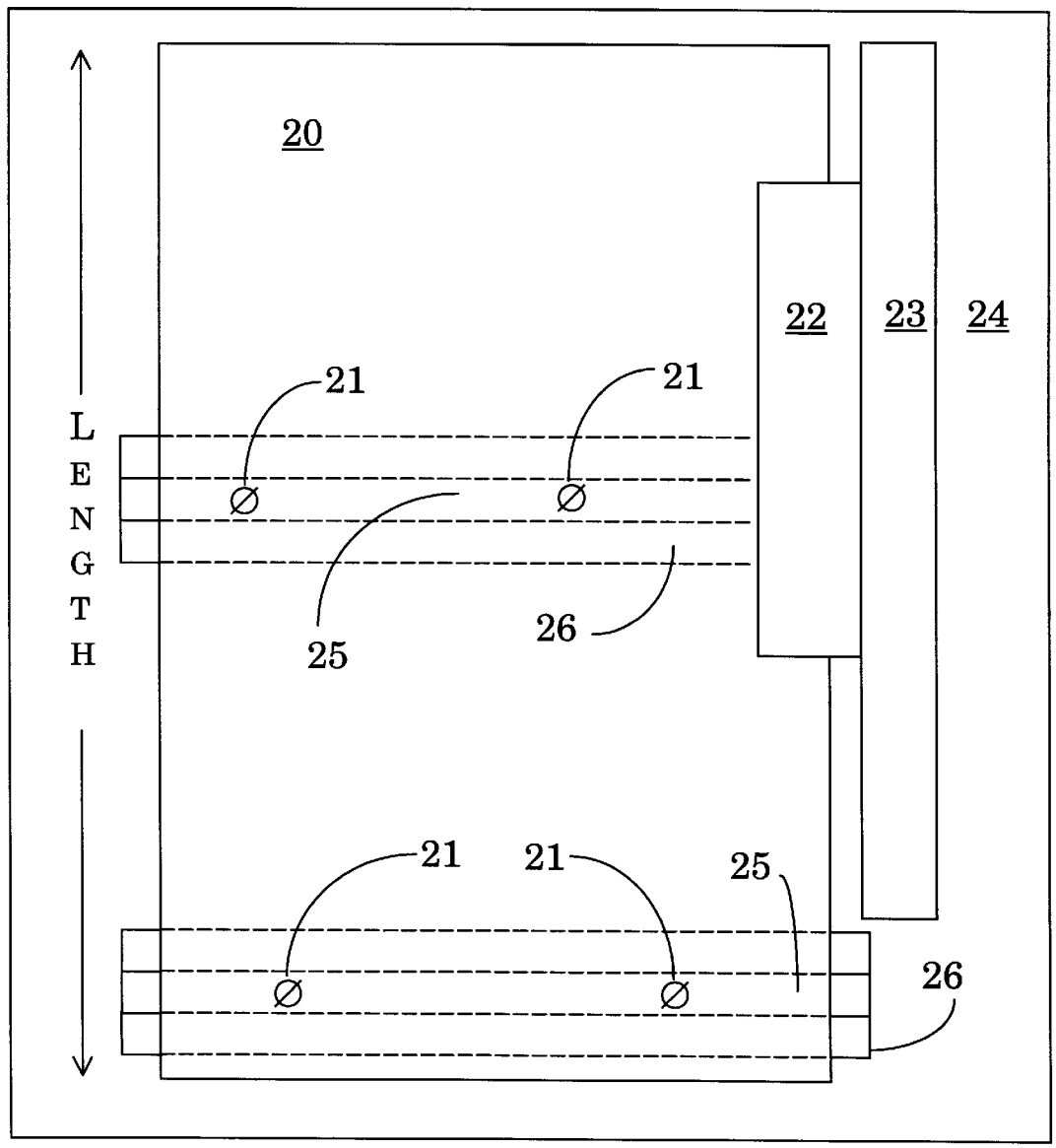
FIG. 2A is a top view of a motherboard in a chassis formed in accordance with one embodiment of the present invention.
Figure 2B:
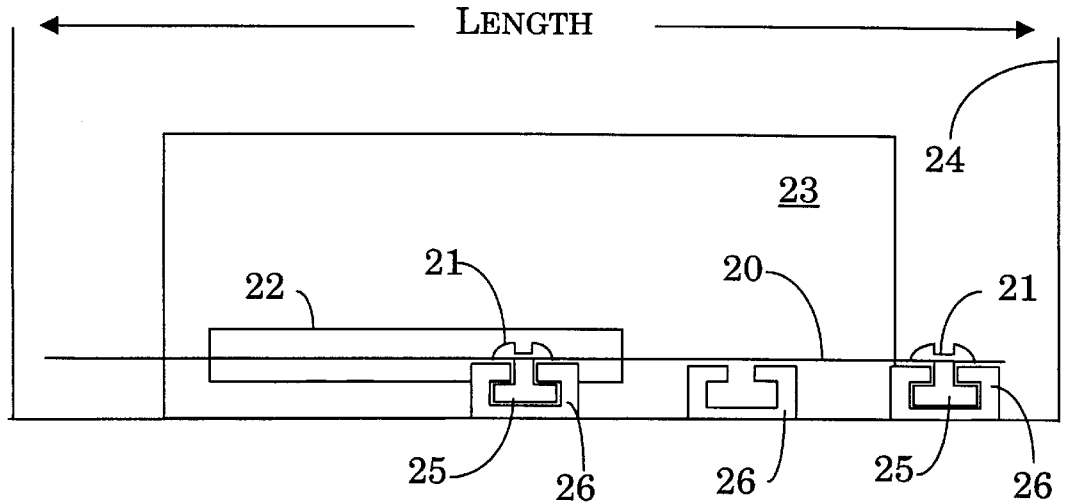
FIG. 2B is a side view of the structure of FIG. 2A.

FIG. 2A is a top-down view of motherboard 20 inside chassis 24 formed in accordance with one embodiment of the present invention. Motherboard 20 is coupled to socket 22 of riser 23, and screws 21, or another type of fastener, such as rivets, are inserted through the motherboard and into rails 25, thereby coupling rails 25 to the underside of motherboard 20. Rail guides 26 are affixed to chassis 24, and rails 25 are coupled to rail guides 26, so that motherboard 20 is ultimately mounted to rail guides 26, along with the chassis, by way of screws 21 and rails 25. FIG. 2B is a side view of FIG. 2A along the length of motherboard 20, showing how rails 25 are attached to motherboard 20 by screws 21. Rails 25 fit into corresponding openings in rail guides 26, as shown, to cooperatively engage rail guides 26, allowing rails 25, along with motherboard 20, to slide along rail guides 26. Motherboard 20 contains a electronic devices and interconnect lines (not shown), many of which are disposed on the top side of the motherboard.

Motherboard 20 includes electrical contact regions disposed at the edge of the motherboard in the region inserted into socket 22. Rail guides 26 are support structures serving to support motherboard 20 and to guide the motherboard into socket 22, aligning the electrical contact regions on the edge of the motherboard with corresponding electrical contact regions inside the socket. In this manner, the proper electrical couplings between motherboard 20 and socket 22 are made. Socket 22 serves to not only support the edge of motherboard 20, but also to hold motherboard 20 in place, keeping the motherboard from sliding out along the rail guides. For one embodiment of the present invention, an additional latching system is used to prevent the motherboard from sliding back out along the rail guides.

In accordance with one embodiment of the present invention, the back of the computer chassis is represented by the upper boundary of chassis 24 in FIG. 2A. This region includes numerous sockets, many of which extend directly from motherboard 20, out the back of the computer chassis. These sockets may include, for example, a small computer serial interface (SCSI) port, printer port, telephone jack, keyboard/mouse port, monitor port, network port, or a universal serial bus (USB) socket. Because these sockets extend out the back of the computer system, they are typically attached directly to the back of the computer system chassis to provide support for when users attempt to plug corresponding cable lines into these sockets in the back of the system. Support for motherboard 20 at the edge of the motherboard closest to the back of the chassis, the outside edge, is provided by the attaching of these sockets to the back of the chassis.

Therefore, in accordance with one embodiment of the present invention, only the inside edge of the motherboard needs to be supported by a rail and rail guide because the outside edge of the motherboard is sufficiently supported by the motherboard sockets that are attached to the back of the chassis. For this embodiment, a rail is affixed underneath the motherboard in a region near the inside edge of the motherboard within approximately two inches from the edge of the motherboard. For another embodiment of the present invention, a rail is affixed underneath the motherboard within approximately one inch from the edge of the motherboard, so that the motherboard overhangs the rail/rail guide support structure by no more than approximately one inch. For an alternate embodiment of the present invention, a rail is affixed underneath the motherboard in a region near the inside edge of the motherboard as well, within approximately two inches from the edge of the motherboard.

In accordance with one embodiment of the present invention, the center of the motherboard is also supported by a rail and rail guide. For this embodiment, a rail is attached in a region underneath the motherboard near the center of the motherboard, within approximately two inches from the center of the motherboard.

For one embodiment of the present invention, only a single rail is attached to the motherboard, located in a position underneath the motherboard where sufficient support is provided to the motherboard when the rail cooperatively engages a rail guide affixed to the chassis. For another embodiment of the present invention, two or more rails are used, along with corresponding rail guides, to attach the motherboard to the chassis, allowing the motherboard to slide along the rail guides.

The rails that mate with the rail guides are attached underneath the motherboard rather than at the edge of the motherboard, allowing the edge of the motherboard to be unbounded by a guide. As a result, a computer system chassis designed in accordance with the present invention accommodates motherboards of varying lengths. For one embodiment of the present invention, motherboard lengths in the range of approximately 10 to 14 inches are supported. In addition, for one embodiment of the present invention, motherboard widths in the range of approximately 7 to 10 inches are supported. Note that the dimensions of the motherboard can vary infinitely within these ranges, not merely vary between discreet sizes within these ranges.

Figure 3:
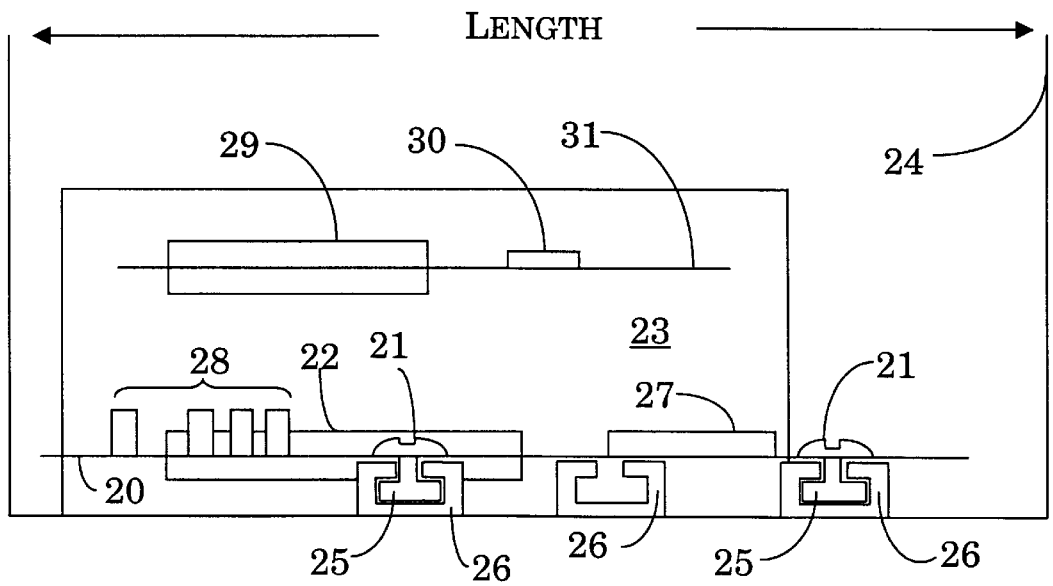
FIG. 3 is the structure of FIG. 2B after additional components have been added in accordance with an embodiment of the present invention.

FIG. 3 is the structure of FIG. 2B after some additional components have been added in accordance with an embodiment of the present invention. An additional socket 29 is attached to riser 23. PCB 31 contains electronic devices and interconnect lines (most of which are not shown). PCB 31, to which electronic device 30 is coupled, is inserted into socket 29, suspending PCB 31 over motherboard 20. Electronic devices, including processor 27 and memory modules 28, are shown coupled to the top side of motherboard 20.

For one embodiment of the present invention, just as motherboard 20 includes electrical contact regions disposed at the edge of the motherboard in the region inserted into socket 22, PCB 31 includes electrical contact regions disposed at the edge of the PCB in the region inserted into socket 29. The electrical contact regions on the edge of the PCB are aligned with corresponding electrical contact regions inside socket 29. In this manner, the proper electrical couplings between PCB 31 and socket 29 are made.

Riser 23 includes interconnect lines (not shown) that electrically couple electrical contact regions of socket 22 to electrical contact regions of socket 29. In this manner, electronic devices attached to motherboard 20 are electrically coupled to corresponding electronic devices attached to PCB 31. For example, for one embodiment of the present invention, electronic device 30 is a digital signal processor that receives a video signal and compresses the signal into a digital format. This compressed signal is then sent along interconnect lines of PCB 31, through socket 29, along interconnect lines of riser 23, through socket 22, and along interconnect lines of motherboard 20 to processor 27. Processor 27 processes the signal and stores the results in memory modules 28.

To enhance the capability of this computer system, a user upgrades processor 27 by, for example, swapping processor 27 with a processor that operates at a faster speed, and upgrades memory modules 28 by adding additional memory modules or swapping with memory modules having more memory capacity. To implement either or both of these enhancements, the user needs to directly access motherboard 20. In accordance with one embodiment of the present invention, this is accomplished by sliding motherboard 20 out of socket 22, along rail guides 26, and out of the chassis. Note that in accordance with this embodiment of the present invention, there is no need to either remove PCB 31 from socket 29, or remove screws attaching the motherboard to the bottom of the chassis.

Figure 4:
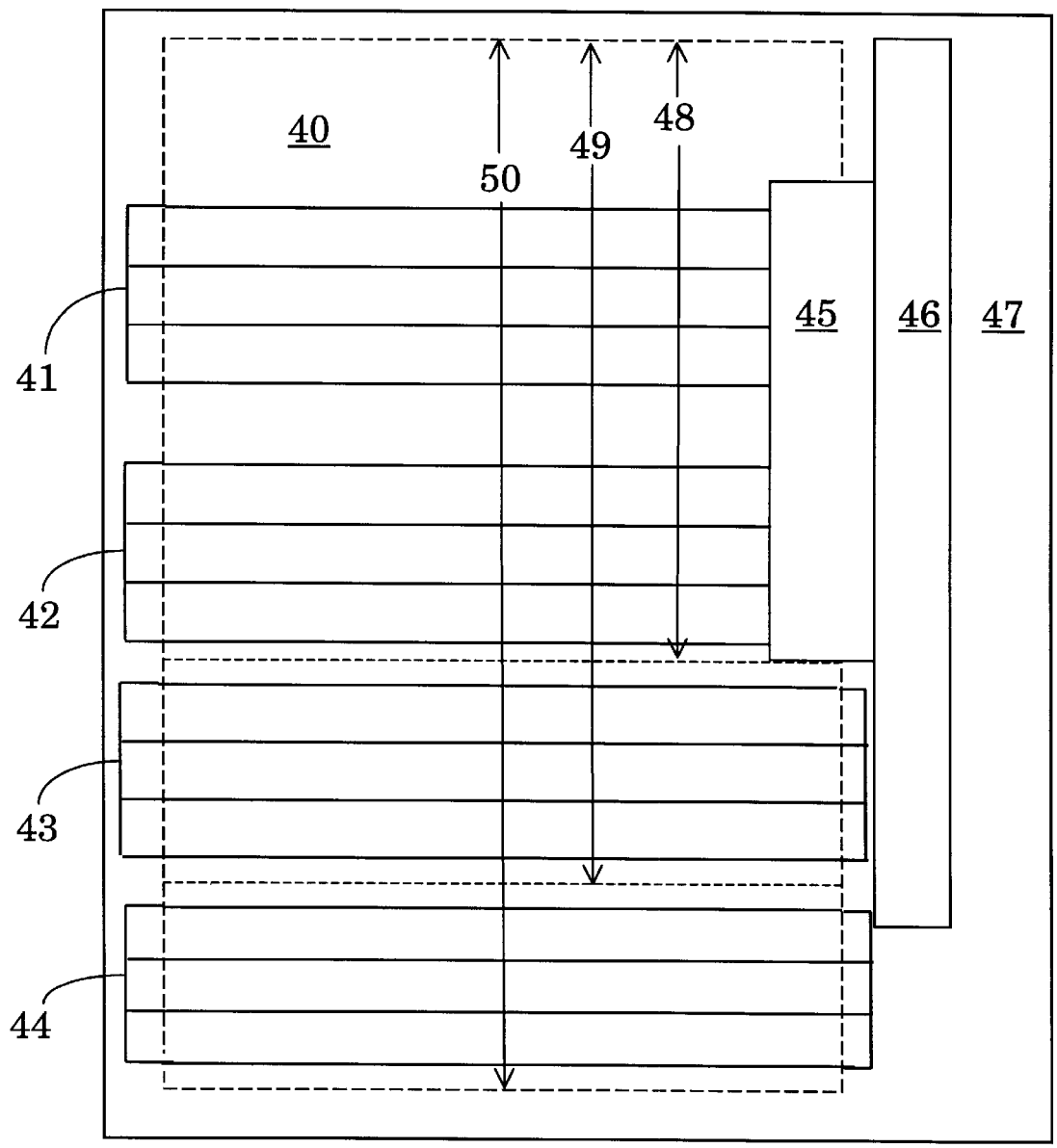
FIG. 4 is a top view of a chassis formed in accordance with another embodiment of the present invention.

FIG. 4 is a top-down view of different sized motherboards 40 inside chassis 47 in accordance with an embodiment of the present invention. Four rail guides, 41–44, are affixed to the bottom of chassis 47. After the motherboard of the desired size is selected, the motherboard is attached to the bottom of chassis 47 by coupling one or more rails mounted underneath the motherboard to one or more corresponding rail guides, as described above. The motherboard is also coupled to socket 45 of riser 46. The motherboard contains electronic devices and interconnect lines (not shown), many of which are disposed on the top side of the motherboard. The selected motherboard of the three shown in FIG. 4 (having a length of 48, 49, or 50) includes electrical contact regions disposed at the edge of the motherboard in the region inserted into socket 45.

In accordance with one embodiment of the present invention, the selected motherboard of the desired length, 48, 49, or 50, has only two rails mounted to its underside, each rail being mounted to the motherboard using two screw fasteners inserted through the motherboard. For this embodiment, the two rails under a motherboard having length 48 are coupled to rail guides 41 and 42. The two rails under a motherboard having length 49 are coupled to rail guides 42 and 43. The two rails under a motherboard having length 50 are coupled to rail guides 44 and 42.

In this manner, the motherboard is supported by a support structure near the edge and center of the motherboard, regardless of the length of the motherboard, thereby reducing motherboard edge overhang and providing secure support for the motherboard. In addition, by changing the location of the support structures depending on the motherboard length, the same number of total screws are used to mount the motherboard to the support structures regardless of the motherboard length. For example, for this embodiment, only four screws are used to mount motherboards of length 48, 49, or 50. This reduces the keep-out regions on the top surface of the motherboard, particularly for larger motherboards that might otherwise require additional fasteners to be inserted for mounting the motherboard to additional support structures.

For another embodiment of the present invention, support structures other than the rail/rail guide combination are implemented such as, for example, post support structures that accept screws or other fasteners. For one embodiment of the present invention, only a single rail and rail guide are used to mount the motherboard to the chassis. For an alternate embodiment, three or more rail/rail guide combinations are used as support structures for mounting the motherboard to the chassis. Also, for an alternate embodiment of the present invention, any number of screws or other type of fastener is used to secure a rail or other support structure to the motherboard.

In this manner, a motherboard and chassis formed in accordance with the present invention provides for easy access to the motherboard for upgrading electronic devices on the motherboard. In addition, the present invention facilitates the swapping of one motherboard for another, even if they are of different lengths. Also, because a predefined total number of fasteners are used to affix the motherboard to the support structures, regardless of the length of the motherboard, there are fewer keep-out regions on the motherboard, particularly for larger motherboards, allowing more electronic devices to be placed on top of the motherboard.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system comprising:
   a chassis; and
   at least three printed circuit board (PCB) support structures affixed to the chassis, the at least three PCB support structures configured to form at least two subset combinations to support a PCB of one of at least two pre-determined lengths, employing a selected one of the at least two subset combinations of the PCB support structures, but a constant predefined total number of fasteners regardless of the length of the PCB and which subset combination of the PCB support structures is used.

2. The computer system of claim 1, wherein the computer system further comprises a PCB of a first of the at least two pre-determined lengths, and the PCB is a motherboard.

3. The computer system of claim 1, wherein the PCB support structures are rail guides and the PCB is mounted to the rail guides by rails attached to the bottom of the PCB using the constant predefined total number fasteners.

4. The computer system of claim 1, wherein the constant predefined total number of fasteners is four.

5. The computer system of claim 1, wherein the PCB support structures are placed such that an edge of the PCB overhangs a nearest support structure to which the PCB is mounted by no more than one inch.

6. The computer system of claim 1, wherein the PCB support structures are rail guides, and the PCB is mounted to a first rail guide and a second rail guide by corresponding first and second rails attached to the bottom of the PCB using the constant pre-determined number of fasteners, the first rail being affixed at an edge of the PCB and the second rail being affixed at a center of the PCB.

7. The computer system of claim 1, wherein the fasteners are screws.

8. The computer system of claim 1, wherein the plurality of predetermined lengths of the PCB comprise 10 and 14 inches.

* * * * *